US007869378B2

(12) United States Patent
Livet et al.

(10) Patent No.: US 7,869,378 B2
(45) Date of Patent: Jan. 11, 2011

(54) METHOD AND APPARATUS FOR SHARING SLOT ALLOCATION SCHEDULE INFORMATION AMONGST NODES OF A WIRELESS MESH NETWORK

(75) Inventors: Catherine M. Livet, Montreal (CA); Juan Carlos Zuniga, Montreal (CA); John L. Tomici, Southold, NY (US); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1079 days.

(21) Appl. No.: 11/480,070

(22) Filed: Jun. 30, 2006

(65) Prior Publication Data

US 2007/0070943 A1    Mar. 29, 2007

Related U.S. Application Data

(60) Provisional application No. 60/720,580, filed on Sep. 26, 2005.

(51) Int. Cl.
*H04J 1/16* (2006.01)
(52) U.S. Cl. .................. 370/252; 370/337; 370/338; 370/347; 370/442; 455/450
(58) Field of Classification Search ........... 370/443, 370/337, 338, 339, 442, 349, 252; 455/450, 455/451, 452.1, 452.2
See application file for complete search history.

(56) References Cited

U.S. PATENT DOCUMENTS

| 5,130,978 A | | 7/1992 | Mobasser | |
| 5,305,314 A | * | 4/1994 | Edblad et al. | 370/450 |
| 5,767,807 A | * | 6/1998 | Pritchett | 342/374 |
| 7,274,908 B1 | * | 9/2007 | Boone et al. | 455/13.2 |
| 7,283,494 B2 | * | 10/2007 | Hammel et al. | 370/329 |
| 7,496,112 B1 | * | 2/2009 | Danielson et al. | 370/468 |
| 2003/0152059 A1 | * | 8/2003 | Odman | 370/338 |
| 2003/0214969 A1 | * | 11/2003 | Cain et al. | 370/443 |
| 2004/0028018 A1 | * | 2/2004 | Cain | 370/338 |
| 2004/0032847 A1 | * | 2/2004 | Cain | 370/338 |
| 2005/0111403 A1 | | 5/2005 | Rudolf et al. | |

(Continued)

FOREIGN PATENT DOCUMENTS

WO    98/27747    6/1998

(Continued)

OTHER PUBLICATIONS

"IEEE Wireless LAN Edition—A compilation based on IEEE Std 802.11™-1999 (R2003) and it amendments." Sep. 19, 2003.

(Continued)

*Primary Examiner*—Huy D Vu
*Assistant Examiner*—Dady Chery
(74) *Attorney, Agent, or Firm*—Volpe and Koenig, P.C.

(57) ABSTRACT

A method and apparatus for communicating slot allocations of nodes in a wireless mesh network that has data exchanges between the nodes occurring during slots. Each node maintains internal tracking of its slot allocation. A node may request a slot allocation of another node, and each node is enabled to report its slot allocation to other nodes. An information element (IE) and management type messages are introduced for tracking and reporting slot allocations among mesh network nodes.

16 Claims, 1 Drawing Sheet

U.S. PATENT DOCUMENTS

2009/0010152 A1* 1/2009 Ofek et al. .................. 370/216

FOREIGN PATENT DOCUMENTS

| WO | 03/003620 | 1/2003 |
| WO | 03/040866 | 5/2003 |
| WO | 2004/095764 | 11/2004 |

OTHER PUBLICATIONS

"Draft Amendment to Standard for Information Technology—Telecommunications and Information Exchange Between Systems—LAN/MAN Specific Requirements—Part 11: Wireless Medium Access Control (MAC) and physical layer (PHY) specifications—Amendment 9: Radio Resource Measurement." IEEE P802.11k/D2.2, Jul. 2005.

"IEEE P802.11s™/D0.01—Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking." IEEE P802.11s/D0.01, Mar. 2006.

"IEEE P802.11s™/D0.02—Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment: ESS Mesh Networking." IEEE P802.11s/D0.02, Jun. 2006.

Cain et al., "A Link Scheduling and Ad Hoc Networking Approach Using Directional Antennas," 2003 IEEE Military Communications Conference, vol. 2, pp. 643-648, (Oct. 13, 2003).

Patro et al., "Mobile Agent Based TDMA Slot Assignment Algorithm for Wireless Sensor Networks," *International Conference on Information Technology: Coding and Computing, 2005. ITCC 2005*, pp. 663-667, (April 4, 2005).

Perumal et al., "Neighbor Based TDMA Slot Assignment Algorithm for WSN," XP007901373, at http://dawn.cs.umbc.edu/INFOCOM2005/patro-abs.pdf on Nov. 24, 2006 by WO examiner, (Mar. 1, 2005).

* cited by examiner

METHOD AND APPARATUS FOR SHARING SLOT ALLOCATION SCHEDULE INFORMATION AMONGST NODES OF A WIRELESS MESH NETWORK

CROSS REFERENCE TO RELATED APPLICATIONS

This application claims the benefit of U.S. Provisional Application No. 60/720,580 filed Sep. 26, 2005, which is incorporated by reference as if fully set forth.

FIELD OF INVENTION

The present invention is related to a wireless mesh network, (e.g., a wireless local area network (WLAN) mesh), including a plurality of nodes. More particularly, the present invention is related to the sharing of slot allocation schedule information amongst the nodes of a mesh network.

BACKGROUND

In an IEEE 802.11 mesh network, (e.g., a WLAN mesh), two or more nodes exchange data during periods called slots. The term "slot" implies multi-dimensional information, which may include, but is not limited to, timing information, (e.g., starting time and duration), radio frequency (RF) information, (e.g., the radio and the number of channels used by the node to exchange data), quality of service (QoS) information, (e.g., the QoS required by the data to be exchanged during the slot), peer node information, (e.g., the node identifiers for each node involved in the transmission of data during a particular slot), direction of data exchange, (e.g., unidirectional, bidirectional), or the like.

In conventional non-mesh WLANs, optional "scheduling" based on 802.11e HCCA is a one-sided procedure controlled by an AP in a basic service set (BSS). In a WLAN mesh, scheduling should be coordinated among the multiplicity of Mesh Points (MPs) that are providing WLAN mesh services.

It would be desirable to incorporate a mechanism in the nodes of a mesh network which allows the nodes to report information regarding their internal slot allocation schedule and to request such schedule information from other nodes. In order to accomplish this new level of coordination, a method and apparatus for exchanging schedule-related information among mesh points in a WLAN mesh is needed.

SUMMARY

In an IEEE 802.11 mesh network where traffic between nodes is scheduled into allocated slots, an efficient slot allocation across multiple nodes is achieved by allowing the nodes to share their own slot allocation schedule information amongst each other. This provides each node with advance knowledge of the slot availability of other nodes and thereby enables nodes to allocate slot resources in an efficient and non-conflicting manner.

The present invention provides a mechanism which allows nodes in a mesh network to report their internal slot allocation schedule to other nodes in the network, and provides a mechanism which allows nodes in the mesh network to request the internal slot allocation schedule the other nodes.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, a node includes but is not limited to a wireless transmit/receive unit (WTRU), a user equipment (UE), a mobile station, a fixed or mobile base station, a fixed or mobile access point (AP), a fixed or mobile subscriber unit, a pager, or any other type of device capable of operating in a wireless environment.

Within a mesh network, each node internally keeps track of the slots it has allocated after previous and mutual agreement with one or more peer nodes. During a particular slot, the node sends and receives data to/from these peer nodes. The internal tracking record is referred hereafter as a "list of allocated slots" and comprises a list of slots. Each node includes an internal memory which stores a list of its allocated slots.

Figure 1:
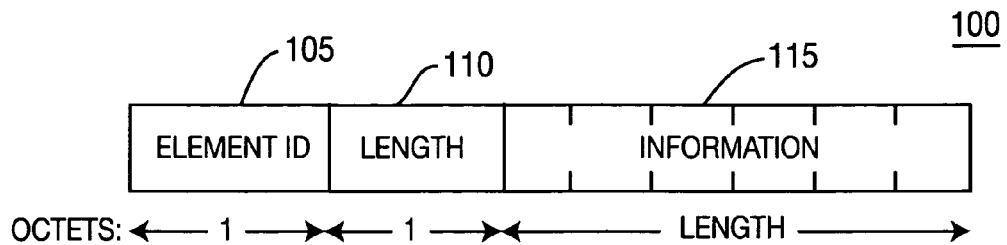
FIG. 1 shows an information element format for slot allocation.

A new information element (IE) 100 is required to represent the list of allocated slots. FIG. 1 shows the preferred format for an IE 100 in accordance with the present invention. The IE 100 includes a one octet element ID field 105, a one octet length field 110, and a variable-length element-specific information field 115. In accordance with the present invention, the ID field 105 indicates that the IE 100 represents a "list of allocated slots" IE. The length field 110 specifies the number of octets in the information field 115.

Figure 2:
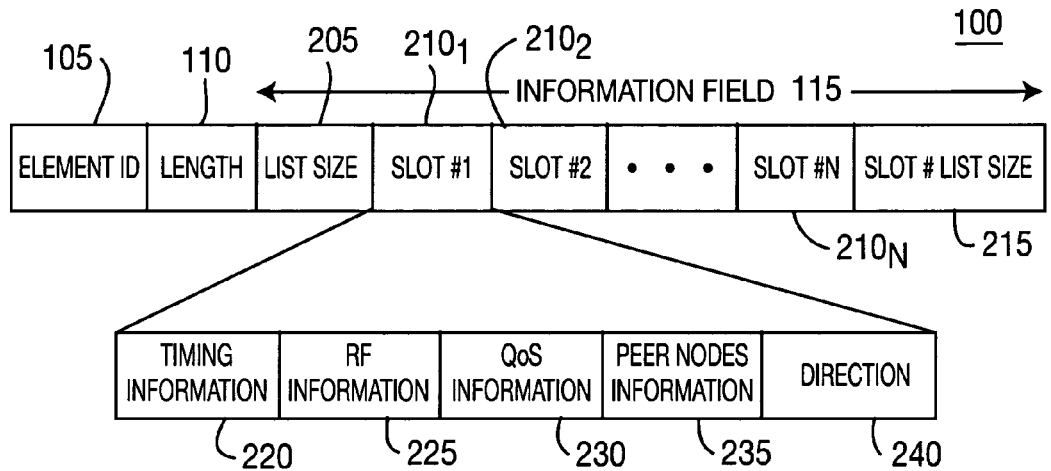
FIG. 2 shows an enhanced information element format according to the present invention.

FIG. 2 shows the new IE 100 in greater detail with respect to the information field 115. The information field 115 of the list of allocated slots IE 100 comprises a list size subfield 205, a plurality of information subfields for each slot $210_1$, $210_2$, ..., $210_N$, and a slot number list size subfield 215. Each slot information subfield 210 comprises a timing information field 220, a radio frequency (RF) information field 225, a quality of service (QoS) information field 230, a peer nodes information field 235, and a direction field 240. As shown in FIG. 2, the subfields shown in greater detail are with respect to slot #1. As such, the slot 1 timing information field 220 indicates a starting time and duration of the data exchange for slot #1. The RF information field 225 indicates the radio channel and the number of channels used by the node to exchange data. The QoS information field 230 indicates the QoS required by the data to be exchanged during Slot #1. The peer nodes information field 235 indicates the node identifiers for each node involved in the data transmission during Slot #1. The direction field 240 indicates whether the data exchange is unidirectional, (i.e., from one transmitter to one receiver), or bidirectional, (i.e., to/from all nodes involved), during Slot #1.

Each node is enabled to request and report its list of allocated slots. This is performed preferably by adding two additional management message types: 1) a "list of allocated slots request message" and 2) a "list of allocated slots response message". The list of allocated slots response message preferably includes the list of allocated slots IE within its body.

The present invention introduces a modification to the existing management "action" frame. A category value "Slot Report" is added to the action frame definition in a medium access control (MAC) entity residing in each mesh node. Slot Report action frames are transmitted by a node to convey its slot allocation information to the other nodes. The Slot Report "category" is used in the management action frame to identify this new category of messages. Within this category, two aforementioned messages, "list request" and "list response", are defined. Within the "list response" message, a new "list of allocated slots" IE is defined.

Figure 3:
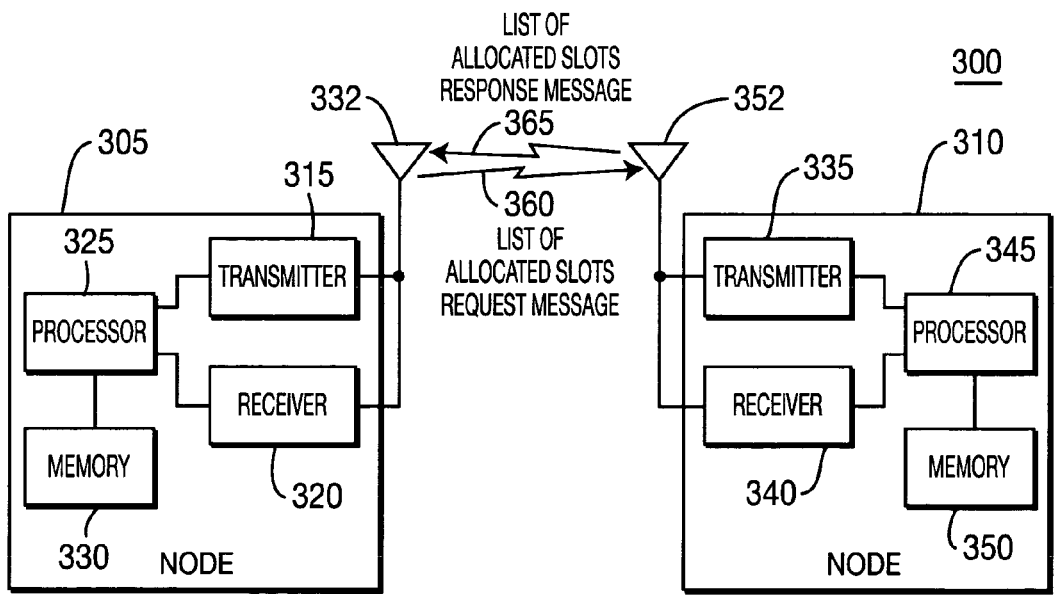
FIG. 3 shows an exemplary mesh network including two nodes which are configured in accordance with the present invention.

FIG. 3 shows an exemplary mesh network 300 including two mesh nodes 305 and 310 which are configured in accordance with the present invention. The node 305 includes a transmitter 315, a receiver 320, a processor 325, a memory 330 and an antenna 332. The node 310 includes a transmitter 335, a receiver 340, a processor 345, a memory 350 and an antenna 352. The processor 325 in the node 305 is configured to generate a list of allocated slots request message 360, which is transmitted by the transmitter 315 via the antenna 332 of the node 305. When node 305 wants to transmit data to node 310, it has to know when node 310 is free to receive data. Thus, the node 305 requests node 310 to provide its "allocated slots," (e.g., slots when node 310 is busy). Thus, the node 305 can request the "list of allocated slots" from node 310 to be able to allocate some free slot to exchange data with node 310.

Each memory 330 and 350 keeps track of slot allocation schedule information associated with its respective node 305, 310.

The memories 330 and 350 also keep track of the slot allocation information of other nodes besides the node that the respective memory resides in. Thus, each node can keep track of the slot allocation of another node after sending a "list of allocated slots request" and receiving a "list of allocated slots response".

When the receiver 340 in the node 310 receives the list of allocated slots request message 360, the processor 345 retrieves the IE 100 from the memory 350 and generates a list of allocated slots response message 365 which includes the IE 100, which is transmitted by the transmitter 335 via the antenna 352 of the node 310. Each of the processors 325 and 345 include a MAC entity (not shown) which facilitates the generation of the list of allocated slots request message 360 and the list of allocated slots response message 365.

The present invention may be implemented in a data link layer, network layer, as software, hardware, middleware, a future system architecture, radio resource management, or radio resource controller (RRC). The present invention is applicable to, but not limited to, IEEE 802.11, IEEE 802.11s, IEEE 802.15, IEEE 802.15.5, IEEE 802.16 and other relevant mesh technologies.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A mesh node comprising:
   a memory configured to store slot allocation information associated with the mesh node;
   a processor configured to generate a message including a list of allocated slots based on the stored slot allocation information, wherein an information field of the message includes a list size subfield, a plurality of information subfields for each of the slots, and a slot number list size subfield, wherein each slot information subfield comprises a timing information field, an RF information field, a quality of service (QoS) information field, a peer nodes information field, and a direction field; and
   a transmitter configured to transmit the message to another mesh node.

2. The mesh node of claim 1 wherein the mesh node operates in a wireless local area network (WLAN).

3. The mesh node of claim 1 wherein the processor is further configured to include a slot report in an action frame used by a medium access control (MAC) entity.

4. The mesh node of claim 3 wherein the slot report transmits slot allocation schedule information associated with the mesh node to another mesh node.

5. A method for transmitting slot allocation information, the method comprising:
   storing slot allocation information associated with a mesh node;
   generating a message, including a list of allocated slots, based on the stored slot allocation information, wherein an information field of the message includes a list size subfield, a plurality of information subfields for each of the slots, and a slot number list size subfield, wherein each slot information subfield comprises a timing information field, an RF information field, a quality of service (QoS) information field, a peer nodes information field, and a direction field; and
   transmitting the message to another mesh node.

6. The method of claim 5 wherein the mesh node operates in a wireless local area network (WLAN).

7. The method of claim 5, further comprising:
   including a slot report in an action frame used by a medium access control (MAC) entity.

8. The method of claim 7 wherein the slot report transmits slot allocation schedule information associated with the mesh node to another mesh node.

9. A mesh node comprising:
   a receiver configured to receive a first message including a list of allocated slots, from a second mesh node;
   a memory configured to store an information element (IE), wherein the IE comprises a list size subfield, a plurality of information subfields for each of the slots, and a slot number list size subfield, wherein each slot information subfield comprises a timing information field an RF information field, a quality of service (QoS) information field, a peer nodes information field, and a direction field;
   a processor configured to retrieve the IE from the memory and generate a second message that includes a response to the first message, that includes the IE in response to the receiver receiving the first message; and
   a transmitter configured to transmit the second message to the second mesh node.

10. The mesh node of claim 9 wherein the element ID field and the length field are each one octet in length.

11. The mesh node of claim 9 wherein the information field comprises:
   a list size field; and
   a plurality of slot information fields.

12. The mesh node of claim 11 wherein each slot information field comprises:
   a timing information field that indicates a starting time and duration of a data exchanged during a respective slot.

13. The mesh node of claim 11 wherein each slot information field comprises:
   a radio frequency (RF) information field that indicates the radio channel and the number of channels used by the second mesh node to exchange data during a respective slot.

14. The mesh node of claim 11 wherein each slot information field comprises:

a quality of service (QoS) information field that indicates the QoS required by the data to be exchanged during a respective slot.

15. The mesh node of claim 11 wherein each slot information field comprises:

a peer nodes information field that indicates node identifiers for each node involved in data transmission during a respective slot.

16. The mesh node of claim 9 wherein the first and second mesh nodes operate in a wireless local area network (WLAN).

* * * * *